US005975181A

United States Patent [19]

Lafond

[11] Patent Number: 5,975,181

[45] Date of Patent: Nov. 2, 1999

[54] STRIP APPLYING HAND TOOL WITH CORNER FORMING APPARATUS

[76] Inventor: Luc Lafond, 23 Woodvalley Dr., Etobicoke, Ontario, Canada, M9A 4H4

[21] Appl. No.: 08/867,042

[22] Filed: Jun. 2, 1997

Related U.S. Application Data

[63] Continuation-in-part of application No. 08/477,948, Jun. 7, 1995, Pat. No. 5,635,019, which is a continuation-in-part of application No. 08/059,960, May 13, 1993, Pat. No. 5,472,558, which is a continuation-in-part of application No. 07/892,038, Jun. 2, 1992, abandoned.

[30] Foreign Application Priority Data

Jun. 3, 1991 [CA] Canada .................................. 2043768

[51] Int. Cl.$^{6}$ ...................................................... B32B 31/00

[52] U.S. Cl. .......................... 156/523; 156/101; 156/102; 156/109; 156/211; 156/257; 156/574; 156/579; 156/468; 156/486

[58] Field of Search .................................... 156/252, 486, 156/211, 101, 257, 256, 391, 468, 510, 513, 523, 525, 574, 162, 109, 199, 579; 83/879, 883

[56] References Cited

U.S. PATENT DOCUMENTS

| | | | |
|---|---|---|---|
| 2,487,951 | 11/1949 | Stein | 156/211 |
| 4,033,806 | 7/1977 | Lindenschmidt | 156/211 |
| 5,013,377 | 5/1991 | Lafond | 156/109 |
| 5,045,146 | 9/1991 | Rundo | 156/391 |
| 5,269,871 | 12/1993 | Longworth et al. | 156/527 |
| 5,384,003 | 1/1995 | Mitchell | 156/510 |
| 5,472,558 | 12/1995 | Lafond | 156/523 |
| 5,635,019 | 6/1997 | Lafond | 156/574 |

*Primary Examiner*—David A. Simmons
*Assistant Examiner*—Linda L. Gray
*Attorney, Agent, or Firm*—McFadden, Fincham

[57] ABSTRACT

A tool for applying strip material to a major face of a substrate including a tool body having a lower surface and a channel extending therethrough and a substrate positioning member adjacent the channel for guiding the tool along the edge of the substrate. The substrate positioning member includes spaced apart front and rear guide members contiguous with the edge. The rear guide member is mounted to a frame pivotally mounted to the tool body and includes two spaced apart rollers. The tool also includes an elevating means for elevating the lower surface of the tool from the major and a cutting means for cutting a slit into the strip material to a selected depth extending by part way into the strip material to permit the strip material to be bent about a corner of the substrate.

17 Claims, 2 Drawing Sheets

STRIP APPLYING HAND TOOL WITH CORNER FORMING APPARATUS

This application is a continuation-in-part application of U.S. application Ser. No. 08/477,948, filed Jun. 7, 1995, now U.S. Pat. No. 5,635,019, which in turn is a continuation-in part of U.S. application Ser. No. 08/059,960 filed May 13, 1993, now U.S. Pat. No. 5,472,558, which in turn is a continuation-in-part application of U.S. Ser. No. 07/892,038 filed Jun. 2, 1992, now abandoned.

FIELD OF THE INVENTION

This invention relates to a strip applying tool for applying strip material to a pair of opposed substrates and more particularly, it relates to a strip applying tool which includes a cutting device for cutting into the body of a strip to permit the strip to form sharp corners, simultaneously during the strip application procedure.

BACKGROUND OF THE INVENTION

In general, when using rigid spacers, the spacer must be cut into precise lengths and the corners then joined by welding or the like. When using flexible spacers, if the degree of flexibility is sufficient to permit a spacer to be bent around a corner, the only problem then arising is the "bunching" of the material at the corner which can affect the performance of the spacer in an assembled IG unit.

Numerous strip applying tools have been proposed in the art, however, these tools have limitations in that many of them incorporate many moving parts, which are susceptible to mechanical failure. In addition, during an application procedure of strip material to a substrate and more particularly, when a corner needs to be formed in the strip, the application procedure using generally known tools must be interrupted and the corner formed therein. As such, this not only has a negative impact on productivity, but additionally provides a potential "weak spot" in terms of the insulation capacity of the strip.

In my earlier patents noted above, one solution was to punch out a portion of the flexible spacer internally of the spacer body so that a physical portion of the material was removed. Thus the spacer was able to form a tight 90° corner. However, by physically removing a portion of the material on the internal face of the spacer strip, the integrity of the strip can be destroyed relative to vapour transmission. Spacers in use today include a desiccant strip or layer on the internal face and by removing a portion of the body at its internal face, the continuity of the desiccant layer is interrupted at several places throughout the IG assembly, which is undesirable.

SUMMARY OF THE INVENTION

One object of the present invention is to provide a tool for applying strip material to a substrate having an edge and a major face comprising a body having a lower surface and a channel extending therethrough for receiving strip material therein, a substrate positioning member adjacent the channel on the lower surface of the body for guiding the tool along the edge of the substrate, the lower surface of the body being elevated from the major face when the strip material is fed through the channel at an angle, and cutting means for cutting into the body of the strip material at its external face.

In the apparatus of the present invention, the cutting means preferably comprises a pair of reciprocating blades although in some cases, depending on the type of spacer material to be cut, single blades can be used. The cutting means, in forming corners for the spacer strip, is intended to form a slit cut from the exterior of the spacer body to a depth sufficient to penetrate the body of the spacer and permit it to form a sharp or tight corner such as in a 90° corner construction in rectangularly shaped IG units. By using the apparatus and method of the present invention, and by virtue of the cutting means forming a slit cut only to a predetermined depth in the body, the integrity of the spacer at the internal surface of the spacer body is maintained while permitting sharp corners to be formed. Thus, the continuity of the desiccant layer will not be interrupted.

The term "depth" as used herein in reference to a slit refers to the direction extending from the exterior face towards the interior face of the spacer body.

The cutting blades will normally be mounted transversely of the direction of feed of the spacer through the apparatus. Suitable actuation means for actuating the blades can be employed. Such means may include a conventional on-off switch associated with the cutting blades. Where a pneumatic drive is employed for movement of the cutting means, suitable on-off pressure switches are appropriate.

A preferred embodiment of the invention utilizes a pair of reciprocating cutting blades; each may be provided with a separate drive system, using a common start-stop system. In the preferred embodiment, the cutting blades and their actuation assemblies can be mounted in a movable housing, with the degree of movement determining the depth of any cutting action into or through a spacer strip.

The tool of the present invention can include a feature to permit the cutting blades to cut right through the spacer body at the end of the spacer application—i.e. where the start and finish ends of the spacer (normally at a corner of the IG unit) are to be joined. The device may thus include adjustable stop means; alternately, the cutting assembly may be movable between first, intermediate and final positions, for providing different types of cuts. In the case of adjustable stop means for the cutting device, a simple lock system may be employed to limit the movement of a cutting assembly.

The spacer type which can be used in the method and apparatus of the present invention is typically any flexible spacer which is known in the art. The material from which the spacer or strip can be made from materials such as butyl polymers, silicones, polyvinyl polymers and other such insulating bodies for spacer application to substrates e.g. glass lites for fabrication of insulated glass assemblies.

The channel within which strip material is fed of the tool may include a guide surface for elevating a portion of the strip off the surface of the substrate where the cutting means contacts the strip. The surface is conveniently angularly inclined relative to the lower surface of the tool. The inclination of the surface is such that the strip material is preferably disposed within the channel at an angle from about 2° to about 50° relative to the lower surface. More desirably, the angle of inclination is below about 30°.

Strip applicator means are preferably positioned at the rear of the tool body to provide a pressure to the strip to engage with the substrate. Various types of applicator means can be employed, a simple one being in the form of an angled guide or a rotatable roller.

The apparatus preferably includes means for spacing at least the front portion of the tool from the substrate surface while the apparatus travels along or is guided along the edge of the substrate. To this end, guide means for spacing at least the front portion of the tool from the substrate surface is employed. By this arrangement, the lower surface of the tool remains out of contact with the substrate thus avoiding any marring or scratching of the substrate surface.

The cutting member is preferably mounted adjacent the front end of the body in operative association with the strip channel. The cutting member provides a slit cut in the strip material to provide the cornering flex point, with reduced bulging, for the strip while it is fed through the channel in an uninterrupted manner. The corner flex point is located inwardly of the outer surface of the strip so that the strip remains continuous on its inner face.

The cutting blades may be actuated by pneumatic, electric or hydraulic systems, with suitable means such as on-off switch means being provided which can be controlled by an operator. Such means may be located in association with the apparatus or may even be foot-actuated by an operator. In a preferred form, the cutting blades are actuated by one or more pneumatic cylinders.

In another aspect of the present invention, the substrate positioning member preferably has the structure where there are front and rear spaced-apart positioning members. These may be in the form of one or more guides such as rotating rollers; there may in fact be guide assemblies in the form of two or more rollers at the front and back of the device. In a particularly preferred form, it has been found that by using spaced-apart guide rollers, and where the tool includes at least one tandem assembly, which is particularly useful where the apparatus is required to apply spacer for curve applications. Cornering is also facilitated while ensuring a smooth, reliable application of the spacer element.

According to a further aspect of the present invention, there is provided a method of placing a strip of material proximate an edge of a substrate having a major face comprising the steps of providing a length of sealant strip from a supply thereof, providing a hand tool having a lower surface and strip feeding channel therein angularly inclined to the lower surface, feeding a length of the strip into the channel such that the lower surface is elevated from the major face, effecting securement of the strip to the edge of the substrate, and cutting the strip inwardly from its outer face with the tool at a corner of the strip to facilitate securement of the strip around a corner edge of the substrate.

Having thus generally described the invention, reference will now be made to the accompanying drawings illustrating preferred embodiments.

DETAILED DESCRIPTION OF THE PREFERRED EMBODIMENTS

Figure 1:
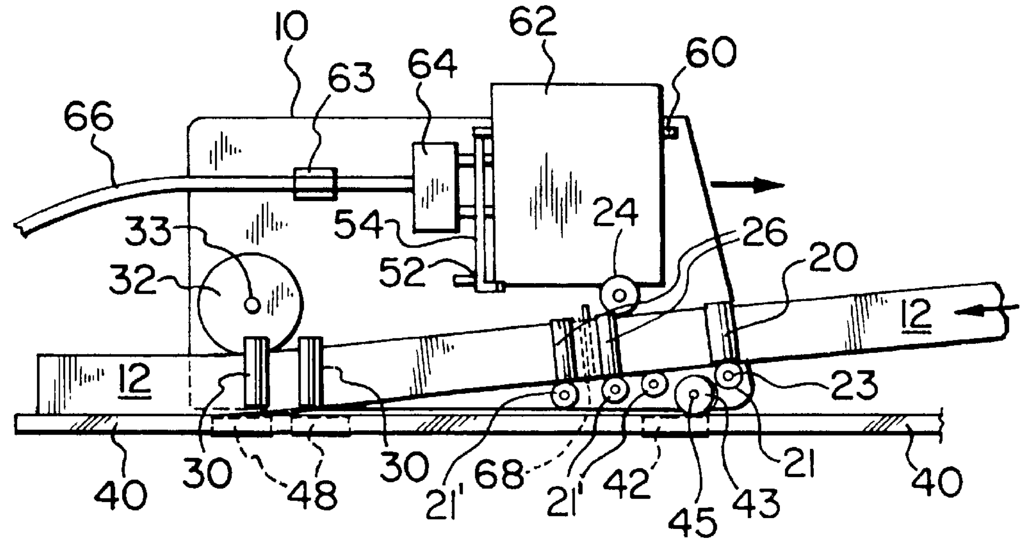
FIG. 1 is a side elevational view of an apparatus of the present invention.
Figure 2:
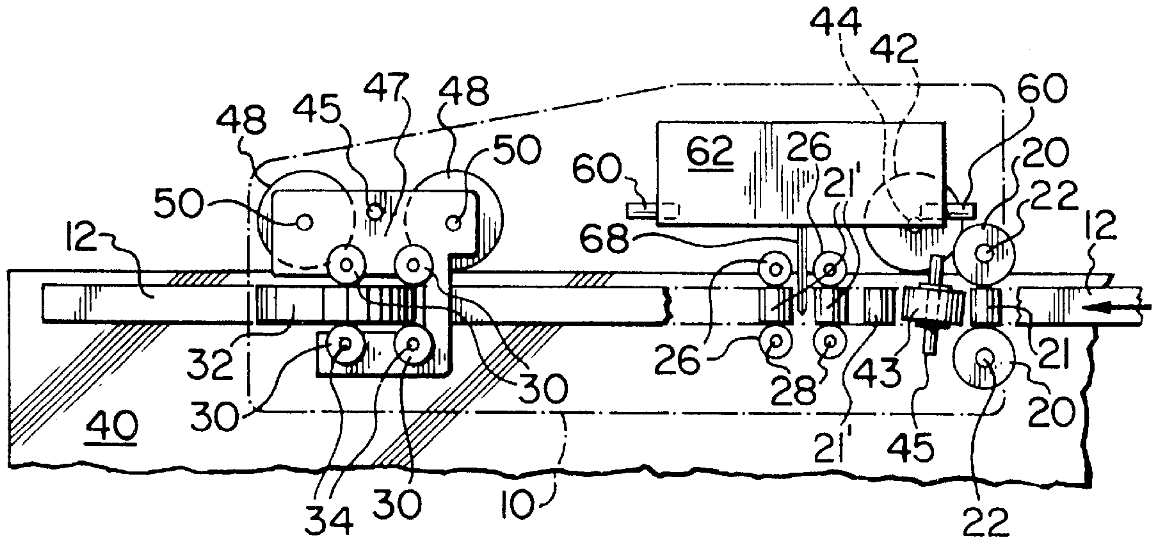
FIG. 2 is a side view of the apparatus of FIG. 1.

Referring now to the drawings the apparatus of the present invention includes a main body or housing indicated generally by reference number 10. The housing includes a lower portion adapted to receive and guide a spacer strip indicated generally be reference numeral 12 into juxtaposition with e.g. a sheet of glass as part of the sequence of forming an insulated glass unit. The arrows shown in the Figures relative to the strip or spacer 12 indicate the direction of movement of the spacer through the apparatus.

The guide system includes a front pair of spaced-apart vertical guide rollers 20 each journalled on shaft 22 forming an inlet for receiving the leading edge of a spacer 12 from a supply thereof (not shown). Guide rollers 20 operate in conjunction with one or more strip-supporting horizontal rollers 21 mounted on a shaft 23; guide rollers 21 form with guides 20 a generally U-shaped chamber through which the strip 12 passes in a supported manner. Additional supporting rollers 21' may be employed depending on the nature of the spacer strip.

The rollers 21 and 21' together co-operate to define a guide surface for supporting the incoming spacer 12. The guide surface, the nature and function of which will be more fully described below, is conveniently angled relative to the substrate by between 2° and 50°, and conveniently less than 30°, such that the surface angles upwardly and forwardly. It will be further seen that the guide surface comprises a convenient means for elevating a portion of the spacer above the surface of the substrate, where the cutting blades 68 (described below) contact the spacer 12.

Two pairs of further guide rollers 26, mounted in a spaced-apart arrangement, each on a shaft 28, serve to form a downstream positioning arrangement for further guiding the spacer strip 12 and also to form a station therebetween for cutting the strip 12 when required. One or more top guide rollers 24 may be employed as desired.

Operating in conjunction with the above guide rollers 20 are two pairs of additional rear guide rollers 30 which in turn, operate in conjunction with a rear pressure roller 32 which is adapted to apply downward pressure on the top of the spacer strip 12 to place the same into contact with a glass strip 40 (normally along the side edge thereof). Guide rollers 30 are each provided with a shaft 34 for mounting the rollers in a vertical alignment. Pressure roller 32 may be adjustably mounted by suitable means (not shown) on its shaft 33 to accommodate different heights of spacer.

To support the front portion of the apparatus, a horizontal roller 43, journalled on a shaft 45, may be provided; the shaft 45 may be mounted to the tool body 10 in an appropriate manner. In a particularly preferred arrangement, shaft 45 journals the roller 43 in an angled relationship relative to the path of movement of the strip through the apparatus. Roller 43 operates on the surface of the glass to provide the desired support for the tool. The skewing or angle of mounting of roller 43 is typically an angle of a few degrees, to 10° or more, which can be employed to create a pulling action when the horizontal guide 42 (described hereinafter) is in contact with the edge of a glass lite. This action allows an operator to ensure that the tool is uniformly held against the substrate edge, which in turn permits a strip to be uniformly applied against the edge of the substrate.

In the apparatus, a front tool guiding roller 42 is mounted by means of a shaft 44 in a horizontal manner, and is positioned so as to permit the apparatus to run along the side edge of a glass substrate 40. Rear guiding rollers 48, mounted on shafts 50, provide a tandem guide assembly for the rear portion of the tool, thus permitting spacer to be applied tangentially to a glass curve. This tandem guide assembly preferably also mounts the pressure roller 32. The tandem guide assembly may include a frame 47 which mounts the various components associated with the rear assembly of the apparatus; the frame which mounts the tandem guides 48 may also be pivotable by being mounted on shaft 45 to permit the assembly to pivot about a fixed point.

Prior to describing the cutting assembly, it will be noted that the embodiment of the tool as illustrated includes pneumatically driven cutting means; to this end, a pivot hinge or shaft 60 is mounted to the body 10; an air cylinder 62 is provided and rotatably journalled on hinge or shaft 60. In a preferred form, the air cylinder 62 comprises a pair of pistons housed in a single casing in a side-by-side manner and arranged so as to provide reciprocating action between the respective pistons. Such side-by-side piston assemblies are known for other purposes and may be conventionally acquired. The assembly also includes an air valve 64, connected to an air supply conduit 66. An on-off switch 63 controls operation of the air supply.

Operatively associated with the piston assemblies are a pair of reciprocating cutting blades indicated generally by reference number 68; blades 68 are adapted for vertical reciprocation and are normally positioned by their respective piston assemblies outside the path in the axial direction of movement of the strip 12. Operating in conjunction with the cutting assembly is a lock assembly indicated generally by reference numeral 54, and including a stop member 52; this functions to permit the cutting blades to vertically cut to a predetermined depth through the body of the spacer 12; The slit thus formed spans the spacer height-wise (i.e. the direction spanning the gap between the glass lites), and a predetermined depth part-way into the spacer extending from the exterior face towards the interior face of the spacer. Other cases, at the last corner, the lock assembly permits an operator to cut right through the body of the spacer 12. The lock assembly can have a fixed position as illustrated whereby the housing of the cylinder 62 abuts the same to prevent the movable cutting assembly from penetrating beyond a desired depth; the lock assembly can also be adjustable if desired to permit cutting of the spacer to various depths by suitable adjusting means, e.g. adjustment screws. In the arrangement shown, by mounting the locking assembly on a pivotable shaft, the operator upon movement of the shaft can permit the cutting blades to cut completely through the spacer.

Figure 3A:
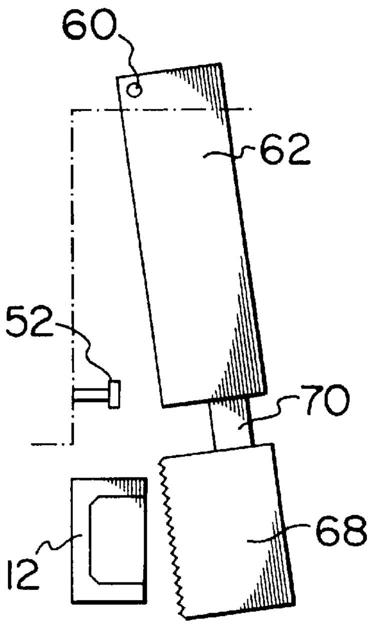
FIGS. 3A, B and C are sequential side views of the position of the blade members during a strip cutting procedure.
Figure 3B:
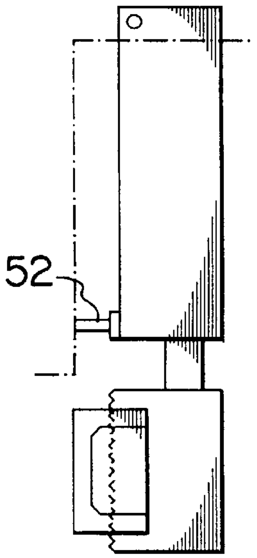

Referring now to FIGS. 3A, B and C, only a single cutting blade 68 is shown connected to a piston rod 70 of a respective actuating means, e.g. a piston 62. As seen in FIG. 3A, piston 62 is mounted on shaft 60 as described above. The diagrammatic illustration of FIG. 3A indicates the normal position of the cutting assembly during placement of spacer 12 on a glass lite where the cutting operation is not required. FIG. 3B shows that on actuation of the cutting assembly and movement thereof into the spacer, for forming a corner only, the cutting blade will advance width-wise across the spacer to a depth governed by the lock assembly 52. The assembly thus prevents the pivotal movement of the cutting assembly, and hence the cutting blades, beyond a predetermined depth into the body of the spacer 12.

Figure 3C:
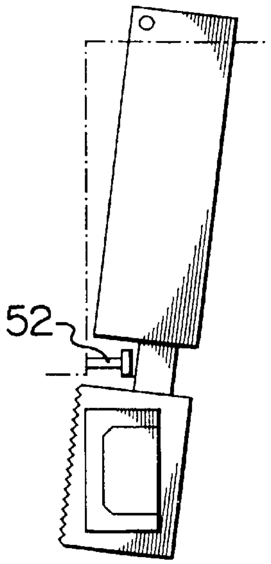

With reference to FIG. 3C, when it is desired to complete cut through the body of the spacer, as in the last cornering operation, the lock assembly 52 is removed from its locking position shown in FIG. 3B to permit the cutting assembly to travel right through the spacer 12 and to sever a length from the source of the spacer.

Figure 4A:
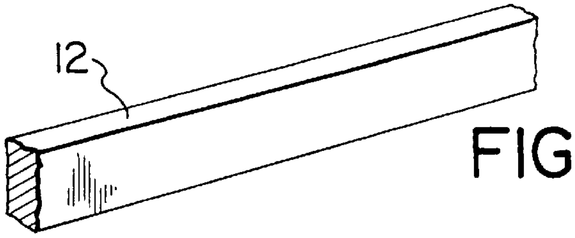
FIGS. 4A, B and C show various stages of a spacer element relative to the operation carried out on the spacer element by the apparatus of FIG. 1.
Figure 4B:
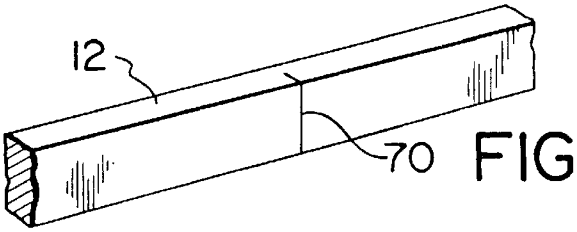
Figure 4C:
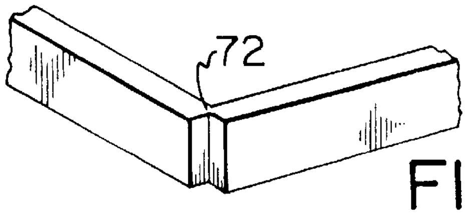

Referring to FIGS. 4A through 4C, a typical spacer 12, which may be used with the apparatus of the present invention, is shown in FIG. 4A. Normally this spacer comes in a continuous roll and typically may be made of a polymer or cellular material (with suitable adhesives being applied to the substrate engaging surfaces if required). FIG. 4A illustrates the spacer as it would be fed through the apparatus when the cutting assembly is not actuated.

In FIG. 4B, when the cutting assembly is actuated to make a slit-cut 70 partially through the spacer body, the cut would appear as illustrated and by turning the apparatus of the present invention around a corner, as in a cornering operation, the strip 12 will assume the configuration shown in FIG. 4C. In this manner, a portion of the strip remains as indicated by the ligament 72.

As those skilled in the art will realize, these preferred illustrated details can be subjected to substantial variation, without affecting the function of the illustrated embodiments. It will be obvious that the features of the present invention, in addition to being utilized in a hand tool, can also be utilized in automated equipment for applying spacer to a glass substrate. Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A tool for applying flexible strip material to a substrate having an edge and a major face, said strip material having a flexible body and an exterior face, said tool comprising:

a tool body having a lower surface and a channel extending therethrough for receiving said strip material therein;

a substrate positioning member adjacent said channel on said lower surface of said tool body for guiding said tool along said edge of said substrate, said substrate positioning member comprising spaced apart front and rear guide members configured to be contiguous with said edge where at least one of said front and rear guide members is mounted to a frame pivotally mounted to said tool body and comprising two spaced apart rollers, an elevating means for elevating said lower surface of said tool from said major face when said strip material is fed through said channel; and a cutting means for cutting a slit into said exterior face of said flexible body to a selected depth extending but part way into said flexible body to permit said flexible body to be bent about a corner of said substrate.

2. The tool as defined in claim 1, wherein said substrate positioning member includes an angularly inclined guide member, said angular inclined guide member being inclined relative to the axial direction of movement of said strip material.

3. The tool as defined in claim 2, wherein said tool includes an actuation means for actuating said cutting means.

4. The tool as defined in claim 1, wherein said cutting means comprises a pair of reciprocating knife means.

5. The tool as defined in claim 1, wherein said tool body includes a strip material guide member for elevating a portion of said strip material above said substrate where said cutting means contacts said strip material.

6. The tool as defined in claim 1, wherein said tool body bears on said major face when said strip material is fed through said channel.

7. The tool as defined in claim 1, wherein only said rear guide member is pivotally mounted.

8. A hand tool for applying strip material to a substrate having an edge and a major face, said hand tool comprising:

a tool body having a lower surface and a channel extending therethrough for receiving said strip material therein;

a substrate positioning member adjacent said channel on said lower surface of said tool body for guiding said tool along said edge of said substrate, said substrate positioning member comprising spaced apart front and rear guide members configured to be contiguous with said edge where at least one of said front and rear guide members is mounted to a frame pivotally mounted to said tool body and comprising two spaced apart rollers, an elevating means for elevating a front portion of said lower surface of said tool body from said major face when said strip material is fed through said channel;

a cutting means for selectively slit-cutting said strip material to a selected depth extending part way into said strip material; and an actuation means for actuation of said cutting means.

9. The hand tool as defined in claim 8, wherein said hand tool includes an actuation means comprising a pneumatic cylinder having a piston, said cutting means being connected to said piston.

10. The hand tool as defined in claim 8, wherein said hand tool further includes a guide wall positioned within said channel for guiding said strip material therethrough.

11. The hand tool as defined in claim 10, wherein said hand tool further includes a pressure roller mounted within said channel for pressurably applying said strip material to said substrate.

12. The hand tool as defined in claim 8, wherein said substrate positioning member includes an angularly inclined guide member, said angularly inclined guide member being inclined relative to the axial direction of movement of the said strip material.

13. The hand tool as defined in claim 12, wherein said cutting means includes a pair of reciprocating cutting blades movable transversely to the path of movement of said strip material through said tool body, a stop means for limiting the degree of movement of said cutting means into the path of movement of said strip material, and a means for individually actuating each of said pair of reciprocating cutting blades.

14. The hand tool as defined in claim 8, wherein said tool body includes a strip material guide member for elevating a portion of said strip material above said substrate where said cutting means contacts said strip material.

15. The hand tool as defined in claim 14, wherein said strip material guide means is inclined relative to said lower surface of said hand tool.

16. The hand tool as defined in claim 8, wherein said tool body bears on said major face when said strip material is fed through said channel.

17. The hand tool as defined in claim 8, wherein only said rear guide member is pivotally mounted.

* * * * *